Nov. 8, 1960  J. W. SMITH ET AL  2,959,699
REINFORCEMENT FOR RANDOM WOUND END TURNS
Filed Jan. 2, 1958  2 Sheets-Sheet 1
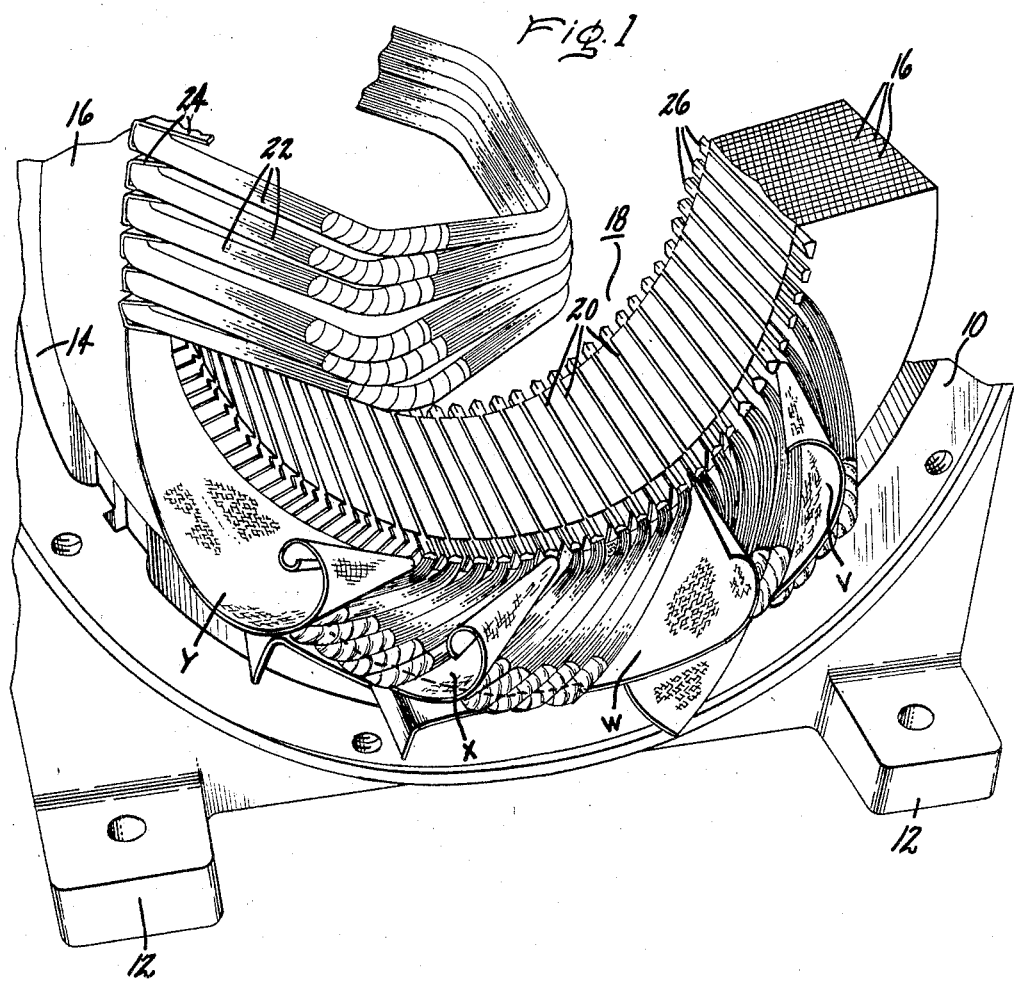
Inventors:
John W. Smith,
Albert B. Zeissler,
by James R. Campbell
Their Attorney.

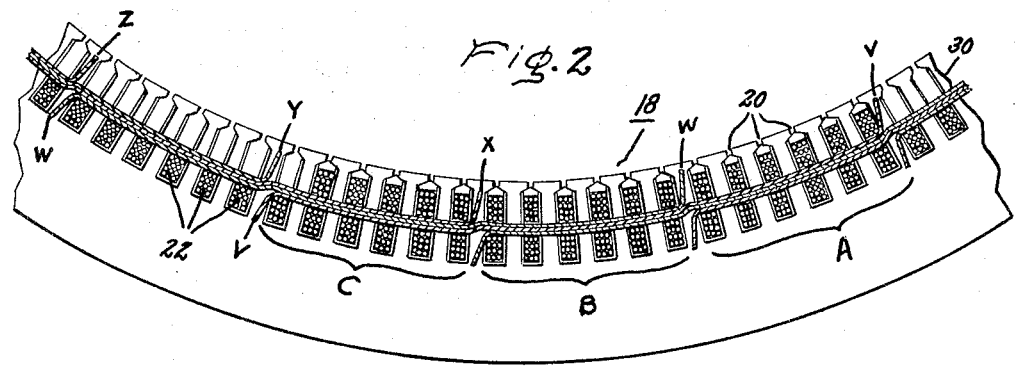
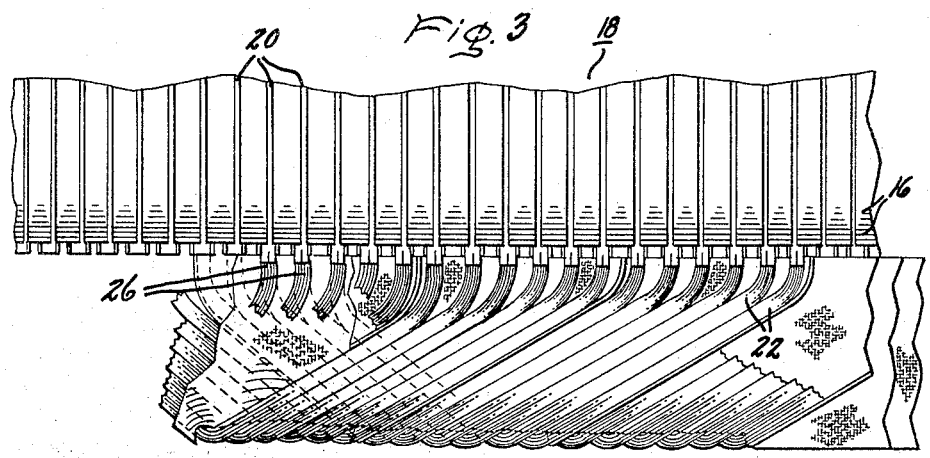
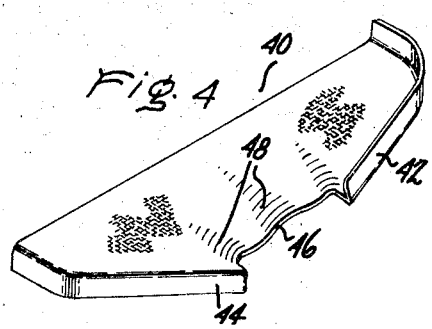

_United States Patent Office_ 2,959,699
Patented Nov. 8, 1960

2,959,699

REINFORCEMENT FOR RANDOM WOUND END TURNS

John W. Smith and Albert B. Zeissler, Scotia, N.Y., assignors to General Electric Company, a corporation of New York Filed Jan. 2, 1958, Ser. No. 706,792

2 Claims. (Cl. 310—260)

The invention described herein relates to dynamoelectric machines and more particularly to reinforcing the end turns of random wound stator coils for imparting rigidity thereto and minimizing vibration and deflection during operation of the machine.

Prior to development of the invention described and claimed in J. C. Acton and A. B. Zeissler Patent No. 2,749,460, maximum power output of random wound rotors was not obtainable because of the tendency of end turns to physically move when subjected to high magnetic forces which work-hardened the copper wire and permitted destruction of turn-to-turn and phase-to-phase ground insulation. The structure of the Acton et al. patent substantially minimized the action described above by utilizing resin impregnated triangular-shaped sections of glass cloth interleaved between the end turns of adjacent coils of different phases. This structure served to rigidly hold the end turns in a preset position and thus permitted the use of higher currents with corresponding improvement of power output from the machine. The success of the Acton et al. invention is firmly established since motors can now be produced having horsepower ratings approximately three times that previously available in machines of the same frame size.

The development of that invention also has shown the desirability of constructing random wound machines of greater horsepower even though the problems of vibration and deflection are amplified because of the increased requirements of greater horsepower per pole. The amount of copper in the slots also has been increased to obtain the new horsepower per pole values thus making more difficult the problem of assembly. Moreover, the phase strips of Acton et al. are discontinuous around the stator core, thus allowing slight end turn movement because of the greater magnetic force which results in cleavage or weakening of the phase strip material. The severe requirements of greater horsepower per pole now demanded therefore call for improved end turn bracing techniques in order to form random wound stators of greater power ratings while still retaining the same frame size of lower horsepower machines.

The primary object of our invention therefore is to provide improved insulation between inner and outer random wound coil layers while simultaneously supplying strength and rigidity to coil end turns for preventing displacement during machine operation.

In carrying out our invention, we insert a plurality of overlapping rectangular resin impregnated glass cloth strips between inner and outer layers of coils installed in a dynamoelectric machine stator. The strips are initially soft and pliable and extend the complete distance between the core laminations, the core slot tubes and nose of coil end turns and further are arranged to project outwardly between adjacent phase groups to insulate them from each other. The resin of the glass cloth strips is cured at the same temperature as other machine components thereby providing a ring of rigid material having the strength substantially of steel and effective in preventing vibration and deflection of the end turns during machine operation.

While the specification concludes with claims particularly pointing out and distinctly claiming the subject matter which we regard as our invention, it is believed the invention will be better understood from the following description taken in connection with the accompanying drawings in which:

Figure 1 is a perspective view of a partially wound stator illustrating the arrangement of glass cloth strips immediately after installation between inner and outer layers of the coils;

Figure 2 is a partial view in elevation of the stator of Figure 1 showing the disposition of the glass cloth strips between coil layers;

Figure 3 is a rolled-out view of a portion of the stator illustrating the relationship of glass cloth strips and coil ends turns; and Figure 4 illustrates the configuration of a single strip after it has been cured in the stator.

Referring now to the drawing wherein like reference characters designate like or corresponding parts throughout the several views, there is shown a stator comprising a frame 10 having feet 12 and a hollow cylindrical portion 14 supporting a plurality of laminations 16 arranged in the usual manner to form the stator core 18. The core is equipped with axially extending slots 20 housing random wound coils 22 insulated from the slot walls by slot tubes 24 and held rigidly in position by slot wedges 26. As indicated in the figures, the machine chosen for illustration is wound for three-phase operation wherein the coils of one phase group are laid in the outer portion 28 of one series of slots and extend exteriorly of the core to a second series of slots where they are positioned in the inner portions 30 thereof, as well known in the art.

The coils 22 which comprise a plurality of insulated magnet wire conductors are preformed prior to assembly in core 18 and during assembly, the coils are laid in the outer portions 28 of the slots and a resin impregnated glass cloth strip is placed on the inward facing surfaces of the coils. The strips are rectangular in shape and are arranged to have one side or end abut the laminations of the core or slot tubes, while the other end extends completely across the coil surfaces and terminates at the nose of the coil end turns as clearly shown in Figure 3. The strips further are of a length sufficient to span the slots of three-phase groups in a circumferential direction, as indicated as A, B and C in Figure 2, and extend outwardly a short distance to insulate and separate each group from the other. Since the resin is only partially cured, the strips are soft and pliable and conveniently can be located in position as assembly progresses.

In order to show more clearly the arrangement of strips between the coil layers, the strips have been identified as V, W, X, Y and Z in the partially wound stator core illustrated. Reference to Figures 1 and 2 will show that each strip spans three phase groups and extends outwardly from between the coils a short distance. Considering strip V, for example, it will be seen that it enters from the inner side of the core and between adjacent coils on the right side of Figure 2, and spans phase groups A, B and C before leaving in a direction outwardly of the core. As is common practice, each coil positioned in the outer portion of the slot is reversely bent to re-enter the inner portion of a second slot, several slots removed, depending on the winding arrangement used. Since all of the coils are reversely bent and positioned in the core in this manner, an overlapping effect results and the strips accordingly are placed between the coil end turns where they overlap. Strip W is placed on the coil ends in the same manner and since it also spans three phase groups, it overlies two-thirds of strip V. Likewise, strip X commences with the third phase group (C) and overlies one-third of strip V and two-thirds of strip W, as shown. Succeeding strips are placed between the overlapping end turns forming the coil layers, and around the complete core, so that when it is fully wound, a cylinder or ring comprising three layers of overlapping strips appears between the end turn layers.

In order to provide a neat and compact assembly, the excess of material projecting both inwardly and outwardly of the core and between each phase group, as illustrated in Figure 1, is cut off to leave a short section remaining as shown in Figure 2. This section is fitted over the body of an end turn and serves the function of assisting in preventing end turn movement resulting from vibration and deflection, while also providing an insulator between adjacent phase groups.

If it were possible to remove one of the glass cloth strips after the coils and strips were placed between the end turns, it would have the appearance illustrated in Figure 4. The side 40 of the strip is adapted to bear against the core slot tubes and therefore is not disfigured after insertion on the coil surfaces. The up-turned end 42 is that portion of the end of the strip projecting inwardly between adjacent phase groups, while the other end 44 is illustrated as downturned, since it protrudes outwardly of the coils and in a direction away from the core body. Surface 46 illustrates the extent to which the glass cloth strip is decreased in width after installation. As mentioned above, the strip is wider than the distance between the slot tubes and inner surface of the nose of the end turns in order to provide a sufficient amount of material to project outwardly between phase groups. When the end turns are reversed to enter remote slots, they crowd or squeeze the excess material into the nose of the end turns and the material thereby serves the important function of providing additional strength in the nose of end turns where it is needed to reinforce the cylinder or ring formed by the main body of the strips. In effect, such excess material which comprises three layers of glass cloth strips, constitutes an additional supporting lip or band on the cylinder capable of further diminishing end turn movement resulting from the forces of vibration and deflection. Dotted lines 48 illustrate indentations appearing in the strip surface which are caused by those portions of the coil end turns when they are reversed to enter remote slots. Since these indentations fit around a portion of the end turn surfaces, they effectively serve to lock the end turns in position.

A varnish coating is applied to the wound stator core and temperatures employed during the baking cycle are sufficient to thoroughly cure the resin in the strips. This action imparts unusual strength and rigidity to the overlapped strips comprising the cylinder, thus providing a compact structure extremely effective in limiting movement of the end turns when subjected to vibration and deflection resulting from magnetic forces. Further, the laminated cylinder serves as an insulator between the coil end turns at the points where overlapping occurs, in addition to providing an insulating spacer between adjacent phase groups. In both instances, the non-conductive glass cloth strips prevent turn-to-turn or phase-to-phase failure in the event insulation is removed from the coil end turn surfaces. It will be noted that the cylinder or ring extends the full distance from the core to the nose of the end turns to prevent radial deflection, while the ends of the strips between phase groups effectively prevent movement in a circumferential direction. Since the end turn structure comprises a relatively solid mass, air spaces nevertheless appear therein. In many cases, the spaces comprise dead air areas which limit the degree of heat transfer from the coils. Such dead air spaces are eliminated during the varnish dip, however, since the liquid is permitted to enter these areas and adhere to the coils and strips, and when the varnish is baked, a solid rigid mass results which permits efficient transfer of heat from the coils during machine operation.

The impregnated glass cloth which has been used in the practice of this invention is a woven glass cloth, or glass mat, impregnated with a thermosetting resinous composition such as the combination of a high polymeric material, such as polyvinyl formal or other polyvinylal resins, and a heat reactive thermosetting polyester resin is used as the impregnating composition. By a high polymeric material is meant a resinous material of high molecular weight which is in its final state of polymerization or condensation, and which, upon being cast from solution, yields products of high tensile strength and toughness.

The use of a high polymeric solid material imparts toughness to the thermosetting reisn which is usually brittle, and consequently results in a cloth which withstands the shocks, vibrations, and bending stresses encountered during use. Examples of such high polymeric materials and particularly polyvinylal resins, which may be used in the practice of this invention, may be found in U.S. Patent 2,307,588 to Jackson et al., assigned to the assignee of the present invention, and Reissue Patent 20,430 to Morrison et al.

The following impregnating composition has been found to be effective to accomplish the desired results: (1) a polymerizable unsaturated alkyd resin obtained by the esterification reaction of a mixture of ingredients comprising a polyhydric alcohol and an alpha unsaturated alpha-beta polycarboxylic acid, e.g., diethylene glycol maleate; (2) a copolymerizable different monomer, e.g., styrene, polyesters compatible with the above unsaturated alkyd resin obtained by esterfication of allyl alcohol with a polybasic acid, specifically a polycarboxylic acid, e.g., diallyl phthalate, etc., in the ratio, by weight, of about 1 part to 1 to 3 parts of (1); (3) a catalyst for accelerating the copolymerization of the ingredients of (1) and (2), e.g., benzoyl peroxide; (4) a polyvinyl acetal resin, specifically a polyvinyl formal resin, in an amount corresponding to from 15 to 75 percent, by weight, of the total of (1), (2) and (4); (5) a volatile solvent for the ingredients of (1), (2) and (4), e.g., ethylene dichloride, a mixture of ethyl alcohol and 1-nitropropane, a mixture of ethyl alcohol and toluene, etc.; and (6) an inhibitor such as quinone or hydroquinone in an amount of approximately .001 percent to .01 percent of the weight of the reactive materials of (1) and (2). The amount of solvent to be used is between 5 and 20, preferably 10, times the amount of the polyvinyl formal resin in the composition.

While the glass cloth may be impregnated with this composition in any desired manner, it has been found to be preferable to dip the cloth in a bath containing the impregnating composition.

After the cloth has been dipped in the impregnating composition, it is preferably air dried for 2½ to 2 hours at room temperature to evaporate the solvents therein so that the glass cloth is easy to handle and can be stored for an extended period of time.

From the foregoing it is apparent that this invention provides means for supporting the end turns of a random wound coil for the stator of a dynamoelectric machine by the use of an initially flexible impregnated glass cloth which is interleaved in the end turns of the winding and, upon curing, provides a reinforcing brace having substantially the strength of iron is locked in the interleaved position in the end turns.

Although a specific disclosure has been made with respect to the type of glass strips for securing the above-described results, it will be apparent that other types of strips may also be employed. For example, a single strip of material of the same width as above, but having a length slightly greater than the circumferential distance around the core could be used for separating the coil layers, with separate small pieces of glass cloth being placed between coils of adjacent phase groups to provide the desired separation. The separate small pieces could also be of triangular shape and split symmetrically to permit one end to lap over the last coil in one group and the other end to lap over the first coil in the adjacent phase group. Also, other materials can be used in lieu of the glass cloth strips disclosed, such as mica laminates or silicone rubber sheet material.

It will be evident that the principles disclosed herein are equally applicable to reinforcing coils of rotors as well as stators and in other types of electrical equipment wherein the coils are subjected to movement in a manner which may adversely affect their disposition, configuration or operation in such equipment.

In view of the above, it will be evident that many modifications and variations are possible in light of the above teachings. It therefore is to be understood that within the scope of the appended claims, the invention may be practiced otherwise than as specifically described.

What we claim as new and desire to secure by Letters Patent of the United States is:

1. In a dynamoelectric machine, a core comprising a magnetic body having axially disposed slots containing random wound coils, end turns on said coils placed in overlapping relationship exteriorly of said core, a plurality of layers of substantially inflexible material inserted between the overlapped portions of said end turns to form a cylinder of rigid material extending completely around the core for minimizing movement of said end turns when subjected to vibratory and deflecting forces, and a lip integral with said cylinder and positioned in the nose of said end turns for supplementing the strength in said cylinder in resisting end turn displacement.

2. In a dynamoelectric machine, a core comprising a magnetic body having axially disposed slots containing random wound coils, end turns on said coils reversely bent exteriorly of said core to form concentric end turn layers extending around said core, resin impregnated glass cloth strips placed in overlapping relationship between said layers and forming an insulating cylinder of high strength and rigidity capable of limiting displacement of said end turns when said coils are subjected to vibratory and magnetic forces, and opposite ends of each of said glass cloth strips respectively projecting inwardly and outwardly through said layers to prevent preselected groups of said coil end turns from contacting each other when said machine is in operation.

References Cited in the file of this patent

UNITED STATES PATENTS

| | | |
|---|---|---|
| 2,594,693 | Smith | Apr. 29, 1952 |
| 2,602,829 | From et al. | July 8, 1952 |
| 2,749,460 | Acton et al. | June 5, 1956 |